Figures 1, 2:
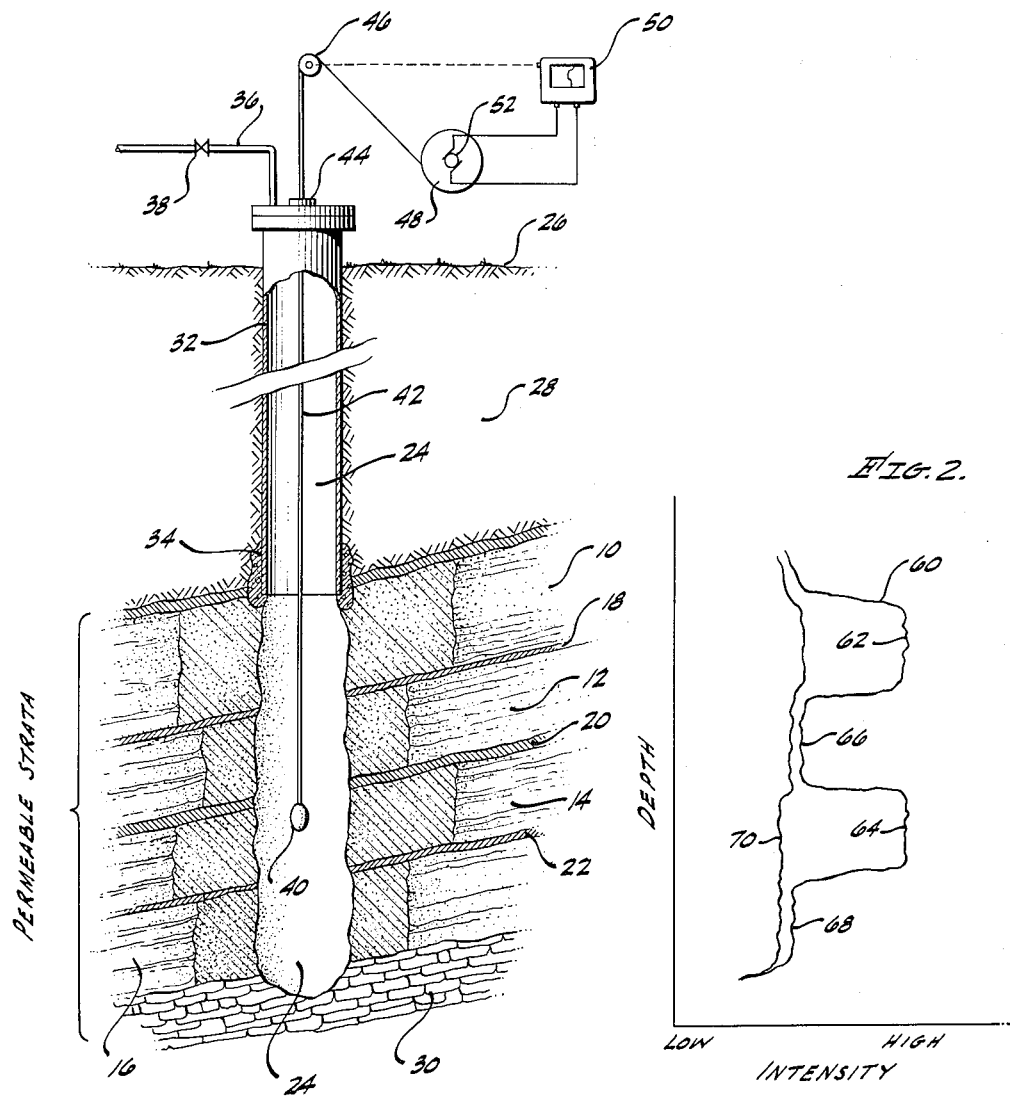

May 22, 1956 T. J. NOWAK 2,747,099
WELL BORE LOGGING
Filed Jan. 29, 1953

INVENTOR.
THEODORE J. NOWAK,
BY
AGENT.

United States Patent Office 2,747,099
Patented May 22, 1956

2,747,099

WELL BORE LOGGING

Theodore J. Nowak, Whittier, Calif., assignor to Union Oil Company of California, Los Angeles, Calif., a corporation of California Application January 29, 1953, Serial No. 334,003

18 Claims. (Cl. 250—43.5)

This invention relates to an improved method for the logging of well bores and in particular relates to an improved method for well bore logging by radioactive means. The invention specifically relates to the radioactive logging of well bores to distinguish the various fluid-producing strata penetrated thereby in terms of the physical characteristics of the fluids flowing into the well bore from each particular stratum.

A number of well logging methods have been employed in which radioactivity of materials introduced into the well bore or of materials present in strata penetrated by the well bore are involved. In one such method, the natural radioactivity, present in all natural rock formations, is measured by passing a Geiger-Müller counter through the well bore and a record is made of the ion current of the counter as a function of depth in the bore. The natural radioactivity of pure limestone and sandstone formations is the least, shaly limestones and sandstones have somewhat higher radioactivity and the radioactivity of shales and other sedimentary formations is highest. The log obtained is referred to as a gamma ray log or gamma ray profile.

Another radioactive logging method, referred to as a neutron log, is practiced in which a neutron source is passed slowly through the bore whereby the penetrated strata are bombarded or irradiated with neutrons which induces a radioactive state in the materials surrounding the bore and whereby a portion of the neutrons are reflected back into the well bore. Following this radiation, a Geiger-Müller counter is passed through the borehole to measure the intensity of the induced radiation and neutron reflection to secure an indication of the formation characteristics. The intensity thus measured is least in those formations containing combined hydrogen such as those formations containing hydrocarbon oils or gas, brine or pure water, or the like. With formations containing less such water, such as shales and various clay formations which are low in water content, the measured return radiation is somewhat higher. With igneous rocks, the measured intensity is highest since there is little, if any, hydrogen absorption of the neutron radiation.

In other cases, radioactive fluids, either containing dissolved radioactive materials or suspended radioactive solid materials, are passed into the well bore for various purposes. In one such process, a drilling fluid containing suspended clays is treated by the addition of finely powdered radioactive solids such as radioactive ores. The fluid in passing through the borehole opposite a permeable stratum exposed during drilling will deposit a mud cake on the exposed face thereof, the thickness and radioactivity of which are proportional to the permeability of the stratum. A radioactivity log will indicate the highest intensity opposite strata having the highest permeabilities and consequently the thicker deposited mud cake. The same effect may be obtained by employing dissolved radioactive materials in the drilling fluid, which materials are adsorbable by the mud cake or the permeable formation.

It should be noted that the use of these radioactive drilling fluids permits the location of permeable strata and an estimation of permeability but does not permit the identification of strata from one another in terms of the type of fluids which they produce into the well bore, that is, it has not been possible heretofore to distinguish positively by radioactive means a permeable stratum which produces brine from one which produces oil or gas into the well bore.

The present invention is directed to an improved method for so distinguishing such permeable strata and for identifying the location thereof, that is, the depth in the well bore. By means of the present invention, it is possible to locate and distinguish the various fluid-producing strata which produce immiscible fluids such as water or brine, gas, hydrocarbon oils and the like. For example, in a producing oil well the penetrated strata producing water may be located and distinguished from those strata producing oil or gas whereby appropriate measures may be taken to seal or shut off those strata producing undesirable fluids, such as water, into the bore.

It is therefore a primary object of this invention to provide a method for borehole logging by radioactive means.

It is another object of this invention to differentiate by radioactive means the individual strata penetrated by a well bore and which produce different fluids into the bore.

It is a particular object of this invention to locate and distinguish from one another strata which are producing immiscible fluids such as water and oil into a borehole.

It is a specific object of this invention to permit the location of water- or brine-producing strata in oil well bores.

Other objects and advantages of the present invention will become apparent to those skilled in the art as the description thereof proceeds.

Briefly, the present invention comprises the preparation of a solution, either aqueous or non-aqueous, of certain specific radioactive materials which are soluble in one or more of the immiscible fluids entering a well bore from subsurface permeable strata penetrated thereby and which are insoluble in at least one other fluid entering the well bore simultaneously from other permeable strata and which radioactive materials additionally are nonadsorbable and are not precipitated in the presence of solids or fluids indigenous to the fluid permeable strata penetrated by the well bore.

The solution thus prepared is then introduced through the well bore to a point therein adjacent the penetrated permeable strata and is injected or forced under the necessary pressure indiscriminately into all of the penetrated permeable strata. Preferably a sufficient amount of such radioactive solution is employed to permit penetration of these strata to an average radial distance of between 0.5 and 10 feet and preferably a distance from about 1 to about 5 feet from the axis of the borehole. The volume of fluid required may be calculated from this radial distance and the estimated porosity and thickness of the permeable strata.

Following this operation, the well bore is replaced on the production and the fluids from the various permeable strata are allowed to flow into the bore and are removed therefrom under their natural pressure or by pumping or by other conventional production means. This normal production is continued for a sufficient time to produce from the formation a volume of fluid at least equal to the volume of radioactive solution previously injected. The time required to effect this result is a function of the flow characteristics of the fluids produced from the permeable formations, the permeability of these formations, the rate at which fluids are withdrawn from the well and similar considerations. Usually a production volume through each stratum of between about 1 and about 10 times the volume of radioactive fluid injected into that stratum will be sufficient. This may be conveniently estimated by allowing the normal production from the well to continue for a sufficient time to produce between about 1 barrel and about 10 barrels of total fluid product for each barrel of radioactive fluid injected and preferably additional fluid substantially equal to the volume of the conduit through which fluids are removed from adjacent the producing strata.

This period of production following the radioactive fluid treatment is an essential part of this method and serves to establish within certain specific permeable formations a radioactive condition which permits positive identification of those strata producing fluids in which the radioactive material is insoluble in or immiscible with the injection fluid from those which produce fluids in which this material is soluble in or miscible with the injection fluid. The fluids which will dissolve the radioactive material are found to effectively dissolve, displace and sweep out the radioactive fluid whereby the radioactivity of the strata is returned substantially to its normal and natural value. In the practice of this invention it has been found that with strata producing fluids in which the radioactive material is insoluble the fluids do not as effectively remove all of the injected radioactive material and consequently the radioactivity following the production period is substantially higher than the normal value.

Following the period of production, the well bore is logged with a conventional Geiger-Müller counter and associated logging equipment similar to that employed in the logging of well bores to determine the natural formation radioactivity. The indicated radioactivity is recorded as a function of depth and the log thus obtained will indicate incremental lengths of the well bore opposite those strata producing fluids in which the radioactive material is soluble, the measured intensities being equal or only slightly higher than the natural radioactive intensity. However, opposite strata which produce fluids in which the radioactive material is not soluble or with which the injection fluid is immiscible, radioactive intensities much in excess of the natural values are obtained. The amount by which the measured radioactive intensity exceeds the natural radioactivity varies with the degree of radioactivity of the radioactive materials employed, its concentration in the injected fluid, its solubility in the immiscible fluid produced from certain strata, the length of the production period and other considerations.

The radioactivity log so obtained serves precisely to identify and locate subsurface permeable strata which produce fluids immiscible with the injection fluid and in which the radioactive material is insoluble. The usual situation which is involved is one in which there are no more than two immiscible fluids such as water and oil, or water and gas, however the same principles are applicable where more than two such fluids occur.

This invention is particularly applicable in distinguishing water-producing strata from oil-producing strata in well bores drilled for the purpose of producing crude petroleum. In many such cases and often in the later producing life of a petroleum well, a relatively large proportion of the fluids removed from the bore consists of water or brine. In many cases the percentage rises to as high as 90% by volume or higher. Since no return is usually realized on the produced brine and a problem arises in its disposal, the expense of producing the minor proportion of oil becomes higher with increasing concentrations of water until the well cannot be economically operated. In such cases the shutoff of the brine-producing strata is necessary and where the brine-producing strata are closely adjacent the oil-producing strata, an accurate location of either one or both is required.

According to one modification of the present invention, as applied to oil wells producing large quantities of brine, an oil solution of an oil-soluble radioactive material which is nonadsorbable and nonprecipitatable by the materials present in the formation is prepared and injected into all exposed permeable strata penetrated by the well bore. The oil-producing strata and water-producing strata alike receive a substantial quantity of the radioactive oil solution. During the subsequent production period, the oil produced from the oil-producing strata very effectively dissolves and displaces the injected oil solution and the radioactive materials contained therein, with which it is miscible, leaving substantially no residual radioactive ingredients in these strata. However, the brine or other fluids immiscible with the injected radioactive fluid is not effective in dissolving and displacing the radioactive material. It has been found that brine does not effectively displace all of the radioactive oil solution from a permeable stratum. The subsequent radioactive log therefore clearly reveals a higher radioactive intensity opposite the strata in which the producing fluid is unable to displace completely the radioactive injection fluid, in the present case the brine-producing strata, so that those strata are precisely located and distinguished from oil-producing strata by their radiation intensity.

In the logging of oil wells it is preferred to use the foregoing procedure since the injection of oils into oil-producing strata is found to have little, if any, adverse effect upon the productivity of the strata whereas the injection of aqueous solutions may have an adverse effect upon permeable strata containing argillaceous materials which tend to swell in the presence of water thereby reducing the fluid permeability.

In preparing the oil injection solutions of this invention, it has been found that the viscosity of the oil used strongly affects the degree to which the oil is retained with its dissolved radioactive material in the permeable strata which produce brine, water or other immiscible fluids. Preferably an oil having a viscosity greater than one centipoise at a particular reservoir temperature is employed. Suitable oils are kerosene, light fuel oil, absorption oil, crude oil, etc.

A second modification of this invention involves the use of an aqueous injection solution containing dissolved radioactive materials. The procedure is the same as given above except that the aqueous injection fluid is substantially or completely swept and displaced from the water- or brine-producing strata whereas the oil flowing from the oil-producing strata does not effectively displace the radioactive aqueous fluid completely. In this case, the regions of highest radioactive intensity indicated by the subsequent logging of the bore denote the oil-producing strata or the strata producing the fluid in which the injected radioactive material is insoluble and with which the injection fluid is immiscible. This modification is less preferred when argillaceous oil-producing strata are involved, but adverse effects can be overcome as follows.

In the foregoing method involving the aqueous injection solution, it is desirable to pretreat the injection solution with water-soluble salts of divalent and polyvalent metals such as the alkaline earth metals and particularly calcium, whereby the adverse effects upon argillaceous oil-producing strata may be avoided. Between 0.5% and 5% by weight of calcium chloride is effective. It should be understood that the aqueous solution is less preferred to that of the use of oil solutions only in those cases where the oil-producing formation is adversely affected by the presence of pure water. Such a situation is encountered in some California oil fields but is by no means characteristic of all or even the majority of oil fields.

The radioactive materials employed in this invention are chosen from chemical compounds which contain radioactive atoms which are gamma ray emitters and which are nonadsorbable by the solid materials encountered in the well bore or in the penetrated formations. They are also selected so as not to be precipitated in the presence of solids or liquids indigenous to the permeable strata penetrated by the bore.

Clays and sands present in permeable fluid-producing subsurface strata are usually negatively charged and this property renders them adsorbent toward positively charged particle or ions such as cations. Therefore, the radioactive constituents are preferably either nonionic in nature or are those which produce radioactive anions. The chemical constituents of the radioactive materials employed should be such that they are not precipitated in the presence of sodium, calcium, magnesium, barium, iron, sulfate, carbonate, sulfide salts and other materials present in oil well brines. Specifically, the radioactive materials must not form insoluble sulfates, carbonates or sulfides and must not form insoluble compounds of calcium, magnesium, barium or iron.

When aqueous solutions are employed as the injection fluid, water-soluble radioactive materials such as salts and soaps having radioactive anions such as the iodides ($I^{131}$), bromides ($Br^{82}$), chromates ($Cr^{51}$), as well as the various nonionic substances which are water soluble and including water-soluble chelates formed from cobalt ($Co^{60}$) and ethylenediaminetetraacetic acid, radioactive cations such as $Co^{60}$ or $Cr^{51}$ and the like may be employed. In the foregoing cases, the radioactive constituent is either in a nonionic form so as to be nonadsorbable and nonprecipitatable or it is in the form of a radioactive anion which is nonadsorbable by the negatively charged solids present in the permeable strata.

When oil solutions of radioactive materials are employed, many of the same considerations apply, that is, the radioactive materials should be such as to render it nonadsorbable and non precipitatable. Such materials such as triphenyl antimony ($Sb^{123}$ or $Sb^{124}$) and other alkyl derivatives of radioactive metals, cobalt naphthenate ($Co^{60}$) and other soaps of radioactive metals and the like may be employed. Other suitable materials for use in oil solutions include iodobenzene ($I^{131}$), brombenzene ($Br^{82}$) and the like.

In the practice of the present invention, it has been found that the amount of radioactivity in terms of millicuries and the concentration of radioactive material in the injection solution should be controlled within limits so that a relatively small but effective intensity of radiation to distinguish the various fluid-producing formations from each other will be obtained. The "quantity" of radioactivity is preferably from 0.05 to 10 millicuries per barrel of the injected fluid or sufficient to produce a residual radioactivity in the immiscible fluid-producing strata equal to at least 10 times the background or normal or natural activity count.

The present invention may be more clearly understood by reference to the accompanying drawings in which:

Figure 1 is a schematic elevation view of a well bore permeable strata penetrated thereby, and Figure 2 is a plot of data characteristically obtained in the practice of this invention.

Referring now more particularly to Figure 1, a semi-schematic elevation view in partial cross section of a well bore penetrating a plurality of permeable strata is shown.

Referring now more particularly to the drawings, subsurface permeable strata 10, 12, 14 and 16 separated respectively by impermeable strata 18, 20 and 22 are indicated and penetrated by borehole 24 which extends from the earth's surface 26 through overburden 28 and terminates in an impermeable rock formation 30. Borehole 24 is provided with casing 32 which supports the upper walls of the borehole through overburden 28 and is provided with a water shutoff 34 in the form of a cement seal which serves to prevent loss of fluids from the permeable strata and the injection of extraneous fluids from the overburden into the well bore.

A conduit 36, provided with valve 38, opens into casing 32 for the introduction or removal of fluids. When this well bore is producing, conduit 36 comprises an outlet line for fluids under pressure discharging from permeable strata 10, 12, 14 and 16 into the well bore which pass therethrough to the surface and are removed through line 36. The illustration in the drawing is that of a flowing well. In many cases the surface pressure is insufficient to force the fluids from that region of the borehole opposite the permeable strata through the bore to the surface and a pump tubing and pump, not shown but conventional and well-known, is extended through the casing to the vicinity of the permeable strata and the produced fluids are pumped through the hole to the surface.

In either case the application of the present invention is substantially the same. A solution containing a dissolved radioactive material as discussed above is prepared. The production of fluids through borehole 24 is discontinued and the radioactive solution is forced under pressure or otherwise passed downwardly through the bore 24 to form an accumulation in the bore opposite the permeable strata. The necessary pressure is then applied by means of hydraulic or gas pressure through line 36 causing the radioactive solution to leave bore 24 and enter the permeable formations in an amount dependent upon the permeability of each individual permeable stratum. The degree of penetration of the radioactive solution is generally indicated by the shaded area immediately adjacent bore 24 where it penetrates the permeable strata. From the degree of penetration, it is indicated that strata 10 and 14 are more permeable than are strata 12 and 16.

Subsequently the well is placed again on production and fluids are drawn from permeable strata 10, 12, 14 and 16 into bore 24 and are removed therefrom. The passage of these fluids causes a displacement of the radioactive fluid back into the borehole and it is removed together with the fluids produced. After producing between about 1 and about 10 times the fluid volume injected and preferably an additional volume equal to the fluid volume of the conduit through which the fluids are transported to the surface, the well bore is logged by passing logging instrument 40 through the bore by means of suspension and conductor cable 42 which extends through lubricator 34 at the top of the well and over sheave 46 onto cable drum 48. Recording instrument 50 is connected to sheave 46 and to commutator 52 whereby a continuous log of the intensity of radiation is made as a function of depth in well bore 24.

Referring now to Figure 2, characteristic radioactivity data obtained according to this invention are shown. The situation corresponds to the strata shown in Figure 1 in which strata 10 and 12 produce fluids in which the dissolved radioactive material is insoluble and strata 12 and 16 produce fluids in which this material is soluble. Curve 60 indicates high radioactivity in portions 62 and 64 opposite strata 10 and 14 while portions 66 and 68 opposite strata 12 and 16 approach the natural or normal background radioactivity curve for the particular strata indicated by curve 70. In this particular case, as indicated in Example I following, strata 10 and 14 were producing undesirable brine, strata 12 and 14 were producing crude petroleum and gas and the solution employed was a kerosene solution of cobalt naphthenate prepared from $Co^{60}$.

It is noted that the flow of water from strata 10 and 14 would not effectively displace the radioactive material injected thereinto in oil solution whereas the flow of oil and gas from strata 12 and 16 effectively reduced the radioactivity substantially to the natural values.

The following data are given as representative of the practice of this invention and are not intended as limitations thereof.

*Example I*

The data indicated in Figure 2 are characteristic of strata in a Southern California oil field in which 4 adjacent permeable strata are penetrated by the bore at an approximate depth of 5750 feet to 6030 feet. The first and third strata, measuring from the surface, are determined to be producing water into the bore by the practice of the invention in the following manner. A radioactive solution of kerosene is prepared by dissolving a sufficient quantity of radioactive cobalt naphthenate in 150 barrels of commercial kerosene to give the solution an activity of 0.10 millicurie per barrel. Well production is halted at a time when normal production is 37.5 barrels per day including 31.5 barrels of brine. The kerosene is then introduced into the well followed by 300 barrels of light fuel oil to which a pressure of 450 pounds per square inch is applied at the surface. This procedure is continued until the radioactive kerosene solution is forced into the permeable strata. Subsequently production is begun and allowed to continue at the normal rate of 37.5 barrels per day until a total of 1500 barrels, equal to 8 times the injection fluid volume plus the production conduit volume is withdrawn. The radioactivity log is then run and the highest intensity is indicated opposite the first and third strata, that is, a depth between 5750 to 5810 and 5880 to 5930 feet. These two strata were ultimately cemented off and the well production continued at 14 barrels per day of which only 1.5 barrels per day were brine.

*Example II*

In another operation according to the present invention, a kerosene solution of iodobenzene ($1^{131}$) is prepared from 100 barrels of commercial kerosene to provide an activity of 7.5 millicuries per barrel of solution. Following the same procedures of Example I, this iodobenzene solution is injected into another well bore penetrating two permeable strata and the subsequent log indicates that the lower of the two exhibited the highest radioactivity indicating that the upper strata only is producing oil.

*Example III*

The procedures of Examples I and II are followed in a third well bore employing a light fuel oil solution of triphenyl antimony prepared from $Sb^{124}$ to give an activity of 0.25 millicuries per barrel of solution. The operation successfully differentiates oil-producing from brine-producing strata.

Examples II and III above have illustrated the use of nonionic oil-soluble radioactive materials in oil solution to distinguish oil- and water-producing strata.

*Example IV*

In a West Texas oil field the well bore penetrated an oil-producing porous limestone at depths ranging between 4050 and 4225 feet. Such structures are not adversely affected by water injection, but the presence of sulfate and carbonate in the produced water may effect precipitation of such radioactive metals as cobalt and chromium, etc. To differentiate the oil-producing strata from those producing brine, 200 barrels containing radioactive cobalt chelate compound, namely, cobalt ethylenediaminetetraacetate in a concentration to give an activity of 0.2 millicuries per barrel of solution are prepared and injected into the well bore. Sufficient oil field brine is forced into the bore following the radioactive solution to bring the latter solution into the permeable water- and oil-producing strata. Following this treatment the well is placed back on production and 2100 barrels of mixed oil and brine are produced from the well. A subsequent radioactivity log indicates highest radioactivity in this interval and that only the upper 17 feet of the porous limestone produces oil into the bore. The strata below this interval is determined to be the brine-producing strata since it has a radioactivity only about 5–10% above the normal value. A subsequent cementing job reduced brine intrusion whereby the well produced 30 barrels per day of crude petroleum containing 16% brine whereas formerly it had produced 5 barrels per day containing 39% brine.

A nonionic water-soluble compound containing highly radioactive cobalt was employed in the process of Example IV. The cobalt chelate compounds successfully tie up the highly radioactive cobalt in a nonionic water-soluble form so that it may be used in permeable strata which tend to precipitate cobalt ions but which strata are not adversely effected by fresh water or brine.

*Example V*

In the same general area of the well bore described in Example IV, a water solution of radioactive potassium iodide prepared from $I^{131}$ is employed to locate the oil- and water-producing intervals in a well bore penetrating a porous argillaceous limestone formation. The radioactive iodide, an anionic radioactive material, was found to be nonadsorbable on the argillaceous materials present in the well and not precipitated by the calcium in the producing interval. The brine-producing strata are precisely located by the low intensity radioactivity in a subsequent logging step and shut off.

The methods of this invention are applicable to the location and differentiation of gas- and liquid-producing strata and in such applications an injection fluid may be employed which is miscible with and displaced from the liquid-producing strata but is not effectively displaced by the gas.

*Example VI*

In a 2900 foot well producing oil and a relatively large quantity of gas, 55 barrels of kerosene containing 0.35 millicurie of brombenzene prepared from radioactive bromine of atomic weight 82 per barrel are injected followed by 200 barrels of crude oil. Subsequent production is continued for a period during which 770 barrels of crude oil and brine are removed from the bore. The production is then stopped and a radioactivity log run. In a producing interval of 37 feet, the gas-producing strata 9 feet thick is located above the strata producing oil and brine into the bore by the higher radiation intensity in this region. The injection oil, being miscible with the crude oil and in which the radioactive brombenzene is soluble, is completely displaced from the oil-producing strata returning the intensity to the normal value while the upper gas strata remains radioactive due to residual injection oil not removed therefrom by gas production.

To distinguish the brine-producing strata from the oil-producing strata, the treatment is repeated using an aqueous solution of 0.35 millicurie of potassium bromide prepared from bromine of atomic weight 82 per barrel. A total of 55 barrels of injection fluid is injected as above, followed by production from the bore. The subsequent radioactivity log indicates higher than normal intensity over an interval of 31 feet (the gas and oil strata) and substantially normal intensity over the lower 6 feet (the brine strata).

In the producing interval of 37 feet thickness, it is indicated that the upper 9 feet produce gas, the next 22 feet produce oil and the bottom 6 feet produce brine.

*Example VII*

The method of this invention is applied as follows to identify a gas strata from strata which produce brine and oil, i. e. three immiscible fluids. The injection fluid, 70 barrels of dioxane, is mutually miscible in the brine and the crude petroleum. Potassium bromide prepared from bromine of atomic weight 82 is dissolved in the dioxane to the extent of 0.5 millicuries per barrel. The injection fluid is introduced into the bore followed by 175 barrels of oil field brine. Subsequent production is continued to produce a total of 900 barrels of brine and oil. The radioactivity log indicates substantially the natural intensity opposite the brine and oil strata since these fluids are mutually miscible with the injection fluid and a substantially higher radioactivity is indicated opposite the gas strata. It is believed that the gas effectively evaporates at least part of the injection fluid to leave the radioactive potassium bromide in the strata pores.

Other mutually soluble injection fluids may be employed in this type of operation such as acetone, methylethylketone, isopropanol, furane, the Cellosolves, dimethylformamide, and the like.

Other radioactive oil- and water-soluble materials may be selected other than those specifically described above by way of example provided the adsorbability and precipitation characteristics discussed above are considered. It is within the scope of the present invention to employ any radioactive compound which is sufficient to give an indication on a Geiger-Muller counter at distances up to about 2 feet when submerged in either water or oil and which are not readily adsorbable by argillaceous materials, sandstones, and other solids characteristic of the strata penetrated by well bores nor precipitated in the presence of solids and liquids present in such strata. The specific radioactive materials mentioned above are merely representative of the class of radioactive compounds defined immediately above and are not intended to limit the class described.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for logging boreholes drilled into the earth and which penetrate permeable strata producing immiscible fluids which comprises forming a radioactive injection fluid miscible with at least one but not all of the immiscible fluids produced from subsurface permeable strata, forcing said injection fluid indiscriminately into all of said permeable strata, subsequently placing the well bore back on production whereby fluids indigenous to said permeable strata flow therethrough into said borehole and are removed therefrom and whereby the radioactive injection fluid is more completely swept out of the strata producing a fluid miscible therewith than out of the strata producing a fluid immiscible therewith, subsequently logging said bore by measuring the radiation intensity with depth and thereby locating and distinguishing the less radioactive strata producing fluid miscible with said injection fluid from the more radioactive strata producing a fluid immiscible with said injection fluid.

2. A method according to claim 1 in which the quantity of radioactive injection fluid injected into said permeable strata is sufficient to penetrate the same an average radial distance of between about 0.5 and about 10 feet from the axis of said well bore.

3. A method according to claim 1 in which the quantity of fluids produced from said permeable strata following the injection of said radioactive fluid and prior to the logging of said borehole is between about 1 and about 10 times the volume of the injection fluid introduced.

4. A method according to claim 3 wherein additional fluids produced from said permeable strata in quantity substantially equal to the volume of the production conduit through which said fluids are conducted to the surface is removed prior to the logging of said borehole.

5. A method according to claim 1 wherein said radioactive injection fluid is prepared by dissolving a radioactive material in a solvent miscible with at least one and immiscible with at least one of the immiscible fluids produced from said permeable strata, said material being substantially nonadsorbable on the solids composing said permeable strata and nonprecipitatable by fluids indigenous thereto.

6. A method according to claim 5 wherein between about 0.05 and about 10.0 millicuries of radioactive material per barrel of injection fluid are employed.

7. A method for logging oil well boreholes to determine the location of and to distinguish hydrocarbon-producing strata from brine-producing strata which comprises dissolving a radioactive material in an injection fluid which is miscible with one fluid produced from said well and immiscible with another fluid produced thereby, terminating fluid production from said well, passing the radioactive injection fluid through the well bore and injecting it radially from the bore into the permeable fluid-containing strata penetrated thereby, next withdrawing fluids from said borehole whereby hydrocarbon and brine flow into said bore from strata containing said fluids and at least partially displace said injection fluid from said strata and whereby the injection fluid is more completely displaced from the strata producing a fluid miscible therewith, measuring and recording the radiation intensity as a function of depth within the well bore at least throughout the interval embracing said permeable strata and locating strata producing a fluid miscible with said injection fluid in regions of relatively low radiation intensity and strata producing a fluid immiscible with said injection fluid in regions of relatively high radiation intensity.

8. A method according to claim 7 wherein said radioactive material is selected from the class consisting of radioactive gamma-ray emitting nonionic compounds and radioactive ionic compounds having gamma-ray emitting anions.

9. A method according to claim 7 wherein said injection fluid comprises a hydrocarbon oil miscible with the hydrocarbon produced in said well bore and immiscible with said brine and wherein said radioactive material is oil soluble.

10. A method according to claim 9 wherein said oil-soluble radioactive material is triphenyl antimony prepared from antimony selected from the class consisting of antimony of atomic weight 123 and 124.

11. A method according to claim 9 wherein said oil-soluble radioactive material is cobalt naphthenate prepared from cobalt of atomic weight 60.

12. A method according to claim 9 wherein said oil-soluble radioactive material is iodobenzene prepared from iodine of atomic weight 131.

13. A process according to claim 9 wherein said hydrocarbon oil injection fluid has a viscosity of above about 1 centipoise at the temperature of the permeable strata.

14. A method according to claim 7 wherein said injection fluid consists essentially of water and is miscible with said brine and immiscible with said hydrocarbon and said radioactive material is water soluble.

15. A method according to claim 14 wherein said water-soluble radioactive material is potassium iodide prepared from iodine of atomic weight 131.

16. A method according to claim 14 wherein said water-soluble radioactive material is a cobalt chelate prepared from cobalt of atomic weight 60 and ethylenediaminetetraacetic acid.

17. A process according to claim 14 wherein a minor but effective amount of a water-soluble salt of an alkaline earth metal is added to said injection fluid to protect argillaceous permeable strata from the adverse effects of water.

18. A process according to claim 17 wherein said salt is calcium chloride added to make a solution thereof of between about 0.5% and about 5.0% by weight in said injection fluid.

References Cited in the file of this patent

UNITED STATES PATENTS

| | | |
|---|---|---|
| 2,352,993 | Albertson | July 4, 1944 |
| 2,385,378 | Piety | Sept. 25, 1945 |
| 2,433,718 | Teplitz | Dec. 30, 1947 |
| 2,451,520 | Teplitz | Oct. 19, 1948 |